_United States Patent Office_

3,284,411
Patented Nov. 8, 1966

3,284,411
OXYMETHYLENE COPOLYMERS
Kenneth Vincent Martin and Otto Franz Leopold Vogl,
Wilmington, Del., assignors to E. I. du Pont de Nemours
and Company, Wilmington, Del., a corporation of Delaware
No Drawing. Filed June 21, 1963, Ser. No. 289,736
2 Claims. (Cl. 260—67)

This invention relates to new and useful compositions of matter and to process for their preparation, and, more particularly, it relates to copolymers of trioxane with certain other monomers.

Copolymers containing a predominance of oxymethylene groups have been disclosed in the prior art, e.g., in United States Patent 2,828,287, issued March 25, 1958, to T. L. Cairns et al., and United States Patent 3,027,352, issued March 27, 1962, to K. W. Bartz et al. The comonomer units in these prior art copolymers are units within the polymer chain, and for the most part these polymers have only lower alkyl side chains.

It is an object of the present invention to provide an oxymethylene copolymer containing a variety of reactive groups as side chain branches from the main polymer chain, and in some cases as terminal groups on the polymer chain. Another object of the present invention is to provide a copolymer having groups as side chains on the copolymer which are active sites for the formation of additional oxymethylene chains.

The above objects are accomplished by providing a copolymer having the general formula

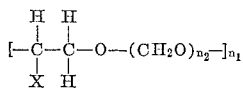

wherein X is a member selected from the class consisting of

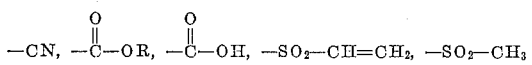

and alkali and alkaline earth metal salts of carboxylic acids having 1 to 10 carbon atoms, and R is a group selected from the class consisting of alkyl, aralkyl, aryl and alkylene groups having 2 to 10 carbons and $n_1$ and $n_2$ are positive integers. More than two types of comonomers may be introduced during the polymerization to produce terpolymers, etc., and the above formula comprehends such materials as the central group is repeated in the polymer chain. Preferably, the segments other than the oxymethylene segment comprise 0.1 to 20% by weight of the polymer chain.

The copolymers of the present invention exhibit a number of physical properties which are substantially different from those of the homopolymers, e.g., in some instances the polymer will be tougher, and in some instances the polymer will have an increase in melting point, whereas in most other instances the polymer will have a decreased melting point with respect to the homopolymer. Depending upon the comonomer, certain polymers of the present invention may be highly cross-linked thereby exhibiting a totally different melt behavior as compared to the homopolymer. If reactive inorganic radicals are incorporated in the copolymer, it will have an entirely different chemical resistivity than the homopolymer. The introduction of reactive organic groups in those copolymers permits them to be modified in a variety of manners.

A wide range of process conditions are available to produce the copolymers of the present invention as will become apparent to one skilled in the art. The compounds which are useful as catalysts for the process of the present invention include the protonic acids, such as hydrogen fluoride, hydrogen chloride, etc., and volatile Lewis acids, usually the Friedel-Crafts metal halides, such as aluminum trifluoride, aluminum tribromide, aluminum triiodide, aluminum trichloride, tin tetrachloride, tin tetrafluoride, tin tetrabromide, tin tetraiodide, ferric chloride, ferric bromide, ferric fluoride, titanium tetrachloride, titanium tetrabromide, boron trifluoride, boron trichloride, boron tribromide, antimony trichloride, antimony trifluoride, antimony tribromide, antimony triiodide, antimony pentachloride, antimony pentafluoride, lead dibromide, cobalt dibromide, cobalt chloride, cobalt fluoride, phosphorus tribromide, phosphorus triiodide, phosphorus trichloride, phosphorus pentafluoride, stannic chloride, stannic bromide, stannic iodide, stannous chloride, stannous fluoride, stannous bromide, and volatile salts of strong acids (those acids having a pK less than 2.0) with weak basis. Certain complexes of the aforementioned metal halides are also operable in the process of the present invention. Complexing agents include tertiary amines e.g., trimethyl amine, tripropyl amine, dimethylstearyl amine, dimethylcyclohexyl amine, dimethylbutyl amine, diethylcyclohexyl amine, diethylbutyl amine, and pyridine. Examples of ethers which will complex with the aforementioned metal halides are the dialkyl ethers, such as dimethyl ether, diethyl ether, dibutyl ether, and dipropyl ether. Inert gases such as nitrogen and carbon dioxide may also be added as diluents in the process of the present invention. Other diluents will be apparent to skilled chemists.

Melting point is determined according to the general procedure based on ASTM–789–53T, 7D, which is modified to the extent that the polymer is first melted on the melting block and allowed to solidify. This technique reduces the possibility of poor heat transfer between the block and the powdery polymer, since the remelted material is in intimate contact with the heating surface and offers the optimum heat-transfer characteristics between the surface and the polymer. The following procedure was used to prepare the polymers of the present invention for determination of melting point value. The polymer received from the process hereinafter termed "crude polymer" was finely divided and 50 parts thereof were thoroughly masticated three times in a Waring Blendor, each time with 100 parts of a 2% aqueous solution of sodium bicarbonate. The polymer was collected, washed with 750 parts of water to remove the sodium bicarbonate and finally washed three times with 250 parts of acetone each time, whereupon the sample was dried in a vacuum oven at 30° C. for 24 hours. Approximately five grams of the polymer thus treated was heated to reflux under an atmosphere of nitrogen with 50 cc. of propionic anhydride containing 1 cc. of quinoline, and after all of the polymer had dissolved the mixture was heated under reflux for an additional ten minutes, and then permitted to cool slowly to room temperature. The solid thus precipitated, was collected, blended with 250 cc. of acetone in a Waring Blendor, filtered, washed three times with 250 cc. of acetone each time, and dried in a vacuum oven at 75° C. for approximately six hours. The melting point of the polymer was determined by placing 10 mg. of the polymer on a Fischer-Johns type hot-block which had previously been preheated to 150° C. The sample was covered with a cover slip under no pressure, and the temperature of the hot-block was increased at the rate of 2° per minute until a temperature of approximately 180° C. was reached, whereupon the material was held at this temperature until all of the solids had melted into a fluid mass. The block was permitted to cool slowly to 150° C. at which temperature the polymer usually solidified to an opaque film in intimate contact with the heating block. Immediately after solidification, the temperature of the block was increased at a rate of 1.5° C. per minute and the melting of the film was observed as being the temperature at which the opaque film was completely transformed into a clear melt which would flow under the glass cover when very low pressure was applied.

The number average molecular weight of the copolymers of the present invention may be measured by classical methods of osometry, although these methods are cumbersome and are not particularly suitable for the lower range of molecular weight. Another method for molecular weight determination and for a comparison of the melt flow characteristics of various materials is the measurement of the inherent viscosity (I.V.) of the polymer, and since this measurement bears a relationship to the weight average molecular weight for most systems, it is used herein to characterize some of the polymers. The I.V. is measured by dissolving the 0.125 gram of polymer, which is stabilized according to the process set forth above for determination of melting point, in 25 ml. of reagent grade phenol which had been purified by distillation from solid caustic. The solubility of the polymers of the present invention in phenol at room temperature varies greatly and it is usually necessary to heat the mixture to about 120° C. to increase the rate of solution of the copolymer. The viscosity of the phenol solvent and the viscosity of the phenol-polymer solution is measured at 90° C. by noting the times required for the same volume of each material to flow through an Ostwald viscometer. The I.V. is then determined by using the formula $$I.V. = \frac{2.303 \log \frac{\text{time of solution}}{\text{time of solvent}}}{\text{grams of polymer/100 ml. solution}}$$

The following examples are presented to illustrate and not to restrict the present invention. Parts and percentages are by weight unless otherwise noted.

*Examples 1 to 3*

These examples illustrate a bulk polymerization to obtain the copolymers of the present invention. The indicated amount of trioxane which had been distilled from sodium and comonomer mixture was placed in a test tube having a volume of approximately 50 cc. and immersed in an oil bath at 65° C. Nitrogen was introduced into the molten material at the rate of approximately 2 cc./minute. The catalyst ($BF_3$) was introduced drop-wise as a liquid complex (boron trifluoride etherate) as indicated in Table I. After the mixture had polymerized to a solid, the material was removed from the test tube, reduced to a fine powder by chopping in a Waring Blendor in the presence of an aqueous solution of sodium bicarbonate, washed with 750 cc. of water to remove the sodium bicarbonate, and finally washed three times with 250 cc. of acetone each time following which the powdery material was dried in a vacuum oven. In order to stabilize the polymer of the present invention for determination of melting point, approximately five grams of the crude copolymer were heated to reflux with 200 cc. of acetic anhydride containing 2 cc. of pyridine under an atmosphere of nitrogen and after all, or substantially all, of the copolymer had dissolved the mixture was heated under reflux for an additional 30 minutes then permitted to cool slowly to room temperature whereupon the solid was collected, blended with 250 cc. of acetone in a Waring Blendor, filtered, washed three times with 250 cc. of acetone each time, and dried in a vacuum oven at 75° C. for approximately six hours. The melting point of the material was determined as described hereinabove. The table shows that the copolymers prepared according to the examples were found to melt in the range of 167 to 176° C. An analysis of the material of the foregoing examples for sulfur according to standard techniques indicated complete incorporation of the divinyl sulfone in the polymer chain.

TABLE I

| Example No. | Mass of Trioxane (Grams) | Type of Comonomer | Mass of Comonomer (Grams) | Volume of Catalyst | Melting Point |
|---|---|---|---|---|---|
| 1 | 50 | Divinyl sulfone | 0.65 | 1 | 173–175 |
| 2 | 50 | do | 1.95 | 1 | 167–172 |
| 3 | 50 | do | 3.25 | 1 | 174–176 |

Although it is quite clear that copolymers may be produced by the aforementioned technique, it is very difficult to distribute the catalyst uniformly throughout the molten mixture of solution with the result that in many cases it is impossible to produce a homogenous product, and, secondly, it is difficult to introduce a low boiling comonomer into molten trioxane. Accordingly, an improved process was devised for producing the copolymers of the present invention and is set forth in the following examples.

*Examples 4 to 13*

The apparatus employed to mix the comonomers and catalysts in the preparation of polymers of these examples was a stainless steel cylindrical mixer having a diameter of approximately three inches and a length of approximately twelve inches and which was jacketed with a standard heating tape to control the temperature in the mixing device. Trioxane and comonomer in the amounts shown in Table II were introduced in separate nitrogen gas streams into the top of the reactor, along with the catalyst also in a nitrogen carrier. The trioxane nitrogen mixture was obtained by passing the nitrogen through a molten solution of trioxane in a stainless steel receptacle. The comonomer was obtained by passing a nitrogen stream through a gas washing tube containing the comonomer which tube was usually heated by a vapor bath held at approximately 5° below the boiling point of the comonomer. The tube was graduated in cc.'s so that the amount of comonomer introduced into the reaction medium could be read directly from the tube. The gaseous mixture from the upper portion of the mixing device passed downward therethrough into a stainless pot attached to the base of the mixing cylinder. This pot, which had a volume of about 3 liters, was used to quench the vapors by immersing the pot in a suitable heat-exchange medium, for example, an ice bath. The apparatus was operated as follows: the heating tapes surrounding the flow lines for the trioxane, comonomer, and catalyst as well as a cylindrical mixer were set to achieve a temperature of approximately 130° C. in each of the lines. The trioxane vaporizer was heated to 120° C. to melt the trioxane and the gas tube containing the comonomer was immersed in a vapor bath at a temperature about 5° C. below the boiling point of the particular monomer indicated in Table II. Nitrogen was passed through the trioxane and comonomer, and at approximately the same instant a gaseous mixture of 10 moles of nitrogen/mole of boron trifluoride was introduced in the upper area of the jet reactor at the indicated flow rate. The mixed vapors from the upper portion of the reactor were quenched in a stainless collection pot which was immersed in an ice bath at about 0° C. The nitrogen gas was bled off through an exhaust port in the collection vessel. The residence time of the vapors in the jet mixer was of the order of about one second. The indicated amount of solid was collected, washed with water, aqueous sodium bicarbonate, and finally acetone before drying at 70° C. in a vacuum oven for seven hours. After this time, the indicated amount of copolymer was recovered and in the cases indicated was stabilized by refluxing the copolymer with acetic anhydride containing pyridine according to the general process of United States Patent 2,998,409, issued August 29, 1961, to S. Dal Nogare et al., following which the copolymer was dried, extruded, and chopped into molding pellets. The melting point and inherent viscosity of the particular materials are also set forth in Table II. In some cases, the base stability of the copolymers was determined as indicated in the table by measuring the mass of polymer remaining after ten grams of polymer had been maintained at 160° C. for one hour in a solution containing 2.5 grams of potassium hydroxide and 150 cc. of benzyl alcohol with the entire mixture being held under a nitrogen blanket during heating.

Copolymers prepared from glycidic esters, e.g., ethyl glycidate and methyl glycidate, can be characterized by the presence of a band in their I.R. spectra at $5.65\mu$ due to the carbonyl band of the ester grouping

Conventional techniques may be employed to determine these bands. When these copolymers are treated with a base, such as sodium hydroxide, for 15 minutes at 85° C. in a dioxane/water solution, the ester is converted into the sodium salt and this can be characterized by its I.R. spectra. The $5.65\mu$ band mentioned above is absent; but it is replaced by two bands at $6.2\mu$ and $7.1\mu$ due to the

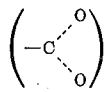

of the sodium salt group.

The copolymers of the present invention may be extruded or injection molded into a wide variety of shaped materials such as films, bristles, filaments, pipe, and like objects. The polymers of the present invention are particularly useful in that the decreased melting point in most cases permits easier processing, and the copolymers exhibiting a moderate flow rate and/or tensile strength are readily adaptable to various manipulations, e.g., orientation, to further modify the physical properties.

We claim:

1. An oxymethylene copolymer containing a variety of reactive groups as side chain branches from the main polymer chain or as terminal groups on the polymer chain and having a major portion of the polymer chain consisting essentially of segments having a general formula

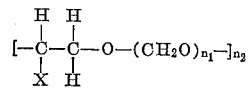

wherein X is a member selected from the class consisting of

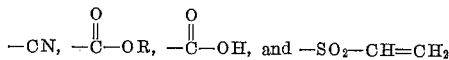

and alkali metal and alkaline earth metal salts of carboxylic acids having 1 to 10 carbon atoms, and R is a group selected from the class consisting of alkyl, aralkyl, aryl and alkylene groups having 2 to 10 carbon atoms and $n_1$ and $n_2$ are positive integers, and wherein the portion of the segments having the general formula

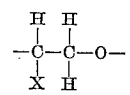

TABLE II

| Example No. | Comonomer | Mass of Trioxane (Grams) | Mass of Comonomer (Grams) | Comonomer/ Trioxane Molar Feed Ratio | Mass of Product (Grams) | Time of Run (Mins.) | Catalyst Rate (cc./min.) | Inherent Viscosity of Capped Product | Melting Point of Capped Product (° C.) | Base Stability of the Uncapped Product (Weight Percent) |
|---|---|---|---|---|---|---|---|---|---|---|
| 4 | Glycidonitrile | 483 | 7.5 | 160/1 | 240 | 25 | 3-4 | 0.91 | 168 | 15-20 |
| 5 | do | 1,524 | 10.5 | 400/1 | 1,080 | 90 | 3-4 | 1.124 |  | 40 |
| 6 | Ethylglycidate | 150 | 5 | 40/1 | 100 | 15 | 4-5 | 1.06 | 168 | 34 |
| 7 | do | 1,300 | 18 | 93/1 | 1,220 | 60 | 4-7 | 0.98 |  | 30 |
| 8 | Methylglycidate | 150 | 3.0 | 57/1 | 125 | 60 | 8 | 0.80 |  | 30 |
| 9 | do | 100 | 4 | 27/1 | 50 | 60 | 6 | 0.85 |  | 44 |
| 10 | do | 290 | 7 | 46/1 | 190 | 20 | 3.5 | 1.14 |  | 42 |
| 11 | do | 1,050 | 16 | 75/1 | 950 | 60 | 3.5 | 1.1 |  |  |
| 12 | do | 1,200 | 27 | 50/1 | 1,100 | 60 | 3.5 | 0.79 |  | 57 |
| 13 | do | 870 | 33 | 30/1 | 770 | 60 | 3.5 | 1.0 |  | 53 |

The foregoing examples show two processes, viz, one wherein the copolymer is produced in a liquid phase and one where the comonomers are mixed in a gaseous phase and polymerized to a solid by quenching the heated vapor. It should be apparent to those skilled in the art that other modifications of the indicated processes are possible without departing from the scope of the present invention, e.g., a suitable solvent or a non-solvent may be employed as a polymerization medium and the comonomers and catalysts may be polymerized in the liquid phase. A particular solvent is not important to the practice of the present invention so long as the copolymers are not degraded by the solvents selected.

The copolymers of the present invention provide thermoplastics having oxymethylene chains and having a wide variety of useful physical properties. Illustrative of these properties are the physical measurements made according to the standard ASTM techniques upon the copolymers of Example 4, which polymer exhibited a flexural modulus of 464,000 p.s.i., a tensile modulus of 474,000 p.s.i., a tensile strength of 8,910 p.s.i., an ultimate elongation of 4.6%, an Izod impact strength of 0.73 ft./lbs./in. and a tensile impact strength of 65 ft./lbs./in.³.

comprises 0.1 to 20 percent by weight of said copolymer.

2. A copolymer of claim 1 having segments of the general formula

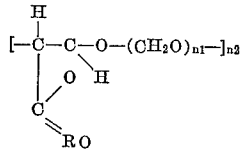

wherein R is a group selected from the class consisting of alkyl, aralkyl, aryl and alkylene groups having 2 to 10 carbon atoms and $n_1$ and $n_2$ are positive integers.

References Cited by the Examiner
UNITED STATES PATENTS 2,688,608    9/1954    Weinstock _____ 260—73

WILLIAM H. SHORT, *Primary Examiner.*

R. T. LYON, *Assistant Examiner.*